(12) United States Patent
Howard et al.

(10) Patent No.: US 8,104,973 B2
(45) Date of Patent: Jan. 31, 2012

(54) FERRULE-TO-FERRULE ADAPTER AND FERRULE ADAPTER ASSEMBLY

(75) Inventors: Joseph P Howard, Hickory, NC (US);
Darrell P Childers, Hickory, NC (US);
Russell J. Granger, Hickory, NC (US);
Myron W Yount, Conover, NC (US)

(73) Assignee: US Conec, Ltd., Hickory, NC (US)

( * ) Notice: Subject to any disclaimer, the term of this patent is extended or adjusted under 35 U.S.C. 154(b) by 380 days.

(21) Appl. No.: 11/673,191

(22) Filed: Feb. 9, 2007

(65) Prior Publication Data
US 2008/0193086 A1 Aug. 14, 2008

(51) Int. Cl.
*G02B 6/38* (2006.01)
(52) U.S. Cl. ............... 385/59; 385/55; 385/60
(58) Field of Classification Search ........... 385/54, 385/59, 65, 69, 55, 60
See application file for complete search history.

(56) References Cited

U.S. PATENT DOCUMENTS

| 4,258,977 | A * | 3/1981 | Lukas et al. ............. 385/60 |
| 5,727,102 | A * | 3/1998 | Jeong et al. ............. 385/59 |
| 6,464,408 | B1 * | 10/2002 | Nolan ............. 385/87 |
| 6,891,735 | B2 * | 5/2005 | Hultermans et al. ......... 361/800 |
| 6,951,425 | B2 * | 10/2005 | Vergeest ............. 385/59 |

* cited by examiner

*Primary Examiner* — Uyen Chau N Le
*Assistant Examiner* — John M Bedtelyon
(74) *Attorney, Agent, or Firm* — Michael L. Leetzow, P.A.

(57) ABSTRACT

An adapter for holding two multi-fiber ferrules in positions to mate with one another includes a main body, a opening extending through the main body configured to receive and optically and mechanically mate the two multi-fiber ferrules. Engagement members, which preferably rotate about an axis transverse to the opening, is disposed adjacent the opening on each side of the adapter to engage and hold the multi-fiber ferrules in the adapter.

18 Claims, 6 Drawing Sheets

FERRULE-TO-FERRULE ADAPTER AND FERRULE ADAPTER ASSEMBLY

BACKGROUND OF THE INVENTION

1. Field of the Invention

The present invention relates generally to an adapter for mechanically and optically connecting two fiber optic ferrules, and particularly to an adapter for mating two multi-fiber ferrules to one another without any connector parts.

2. Technical Background

Fiber optic ribbons are widely used today to transmit a large mount of data rapidly and efficiently. Systems using fiber-optic ribbons typically have multiple connection points, or interfaces, where the light signals must be transmitted from one set of optical fibers to another set of optical fibers. These connection points or interfaces usually involve two optical ferrules that are mechanically and optically aligned to allow the light to traverse the connection points. This is especially true when an optical module or other component of an optical system is provided with a fiber optic pig-tail or multi-fiber ferrule for connecting the optical module to other optical module components in the optical system.

The pig-tails or multi-fiber ferrules must be connected in a secure fashion to other pig-tails or multi-fiber ferrules. However, this connection is difficult, if not impossible to make, without complicated connector components to hold the multi-fiber ferrules or an extensive reworking of the pig-tails and/or multi-fiber ferrules. The ferrules may also be clipped together with a simple resilient clip, but the clips are not real sturdy and do not allow the clipped ferrules to be secured or mounted to appropriate structures.

It would be desirable therefore to provide an adapter that is easily installed, reliable, allows for an easier connection of the system, and is more cost-effective by allowing a ferrule-to-ferrule configuration.

SUMMARY OF THE INVENTION

Disclosed herein is ferrule-to-ferrule adapter that includes a main body having an outside surface, an opening extending through the main body between a first side of the main body and a second side of the main body, the opening configured to receive and to optically and mechanically mate two multi-fiber ferrules to one another, and two ferrule engagement members connected to the main body and disposed adjacent the opening on each side of the main body to engage and retain the multi-fiber ferrules in the ferrule-to-ferrule adapter in mechanical and optical engagement.

In some embodiments, the engagement members are rotatably connected to the main body and rotate about an axis orthogonal to the opening.

In some embodiments, the engagement member is fixed spring latch.

In some embodiments, the fixed spring is disposed on two sides of the opening on the first and second sides of the main body.

In another aspect, a ferrule-to-ferrule adapter and fiber optic assembly that includes two multi-fiber ferrules, each multi-fiber ferrule having at least one optical fiber that terminates at an end face of the multi-fiber ferrule, an adapter main body having an outside surface, an opening extending through the main body between a first side of the main body and a second side of the main body, the opening configured to receive and to optically and mechanically mate the two multi-fiber ferrules to one another, and two ferrule engagement members connected to the main body and disposed adjacent the opening on each side of the main body to engage and retain the multi-fiber ferrules in the ferrule-to-ferrule adapter in mechanical and optical engagement.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
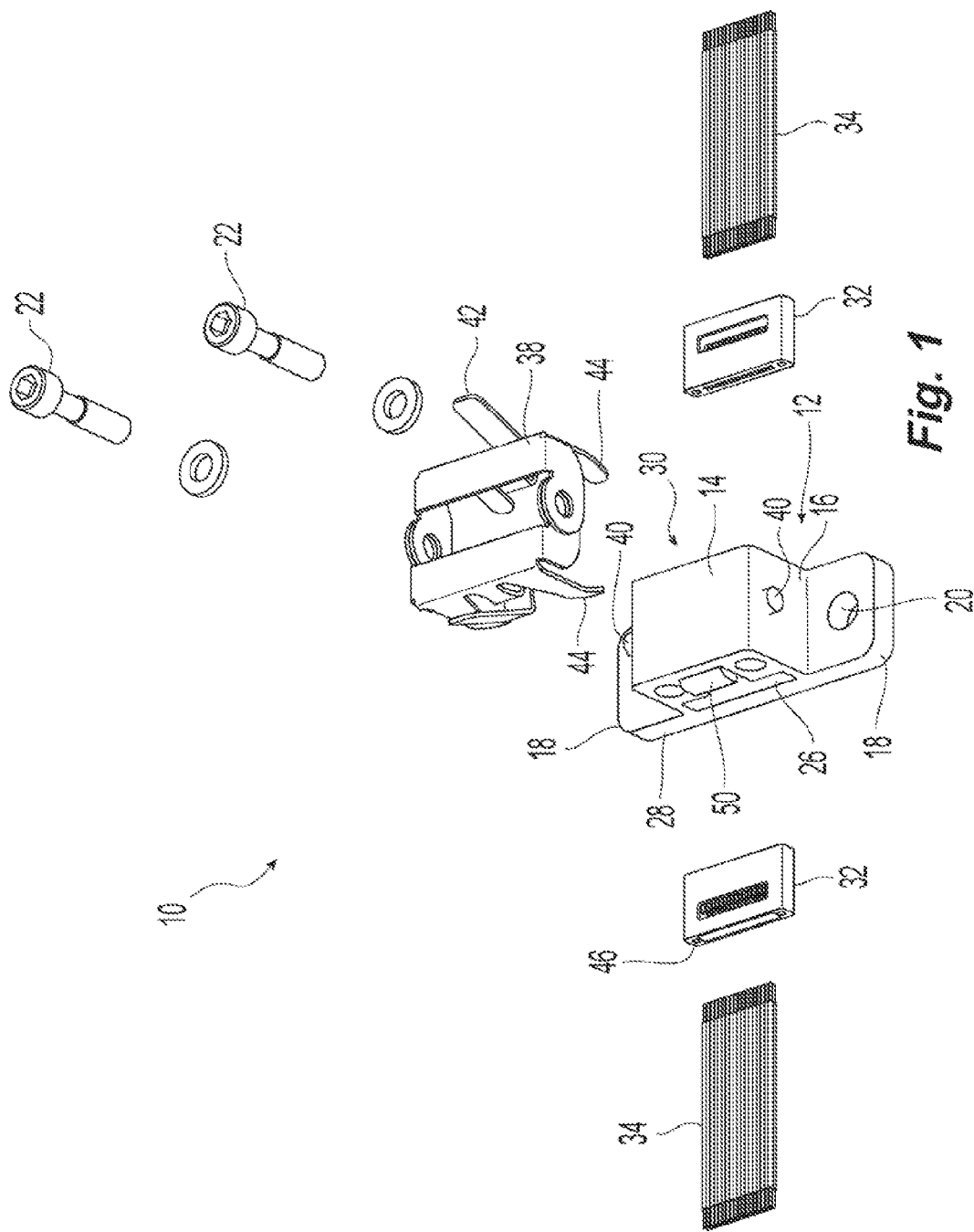
FIG. 1 is an exploded perspective view of an adapter according to the present invention with a two multi-fiber ferrules shown therewith.
Figure 2:
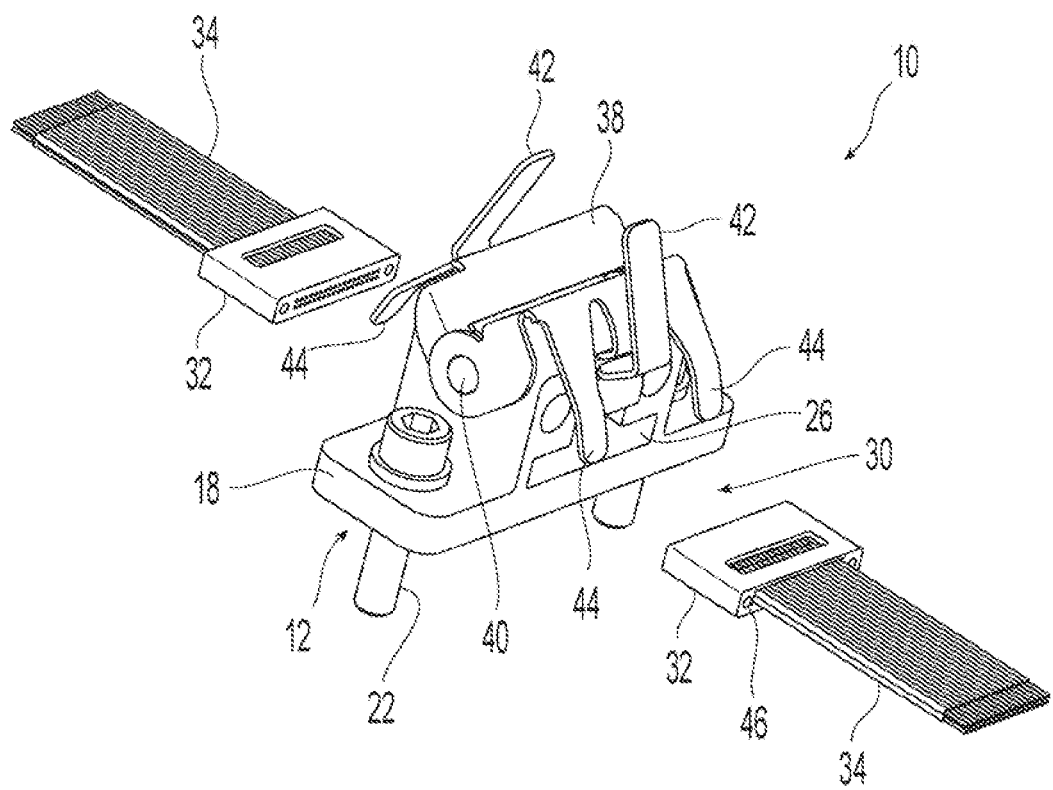
FIG. 2 is a perspective view of the adapter of FIG. 1 assembled.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, adapter 10 has a main body 12 with a main portion 14, an outside surface 16, and flanges 18 extending outward from the main portion 14. Each of the flanges 18 preferably has a mounting hole 20 to mount the adapter 10 to a PCB board, box, or other structure. The flanges 18 are preferably integral with the main portion 14, but may be separate from and connected to the main portion 14. Screws 22 are used to mount the adapter 10 to the appropriate structure. It is also possible for projections or legs to extend downward, rather than holes and screws, to secure the adapter 10 to the appropriate structures.

Figure 3:
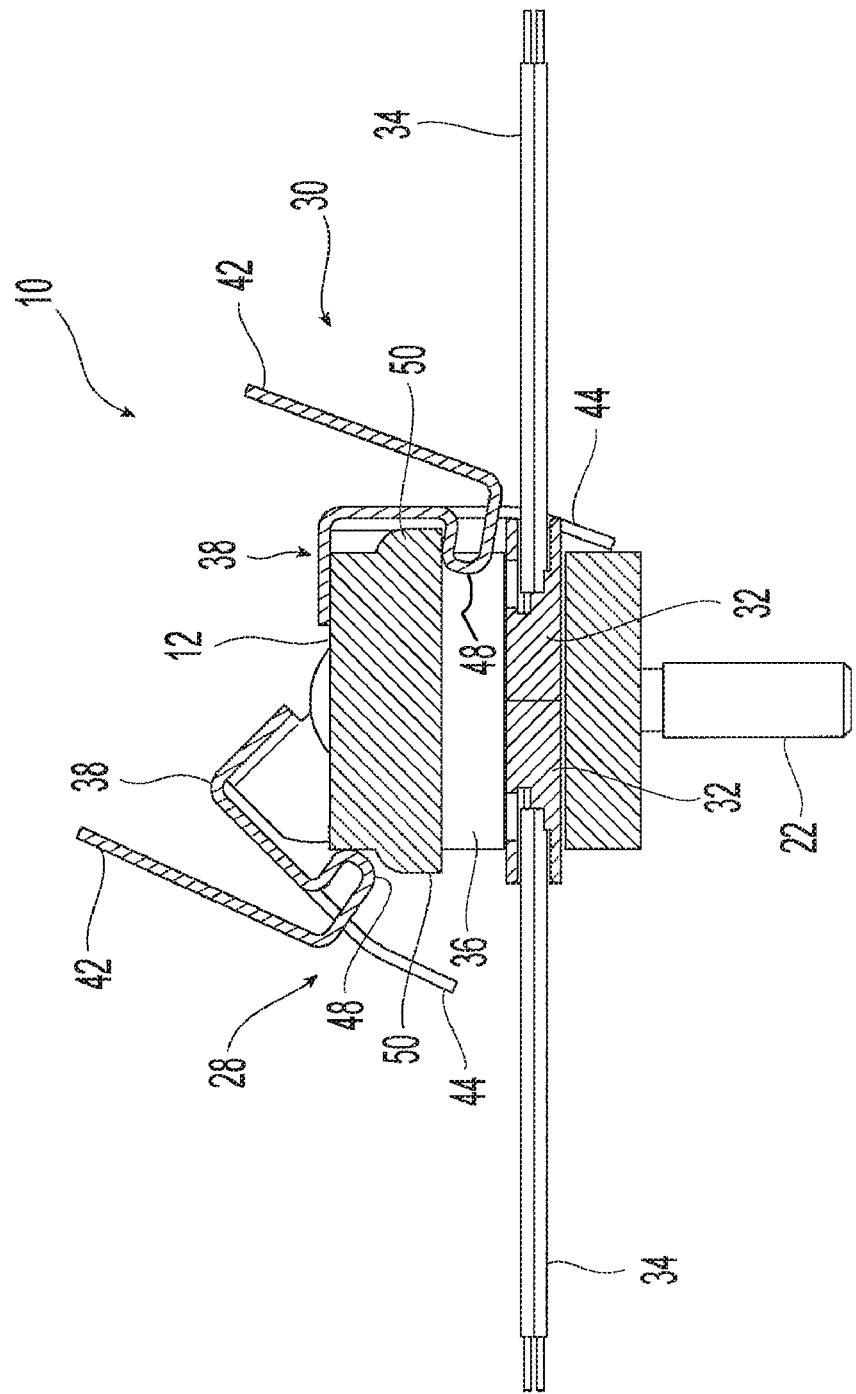
FIG. 3 is a lengthwise cross section view of the adapter of FIG. 1 with two multi-fiber ferrules inserted therein and one side in an open position and one side in a closed position.
Figure 4:
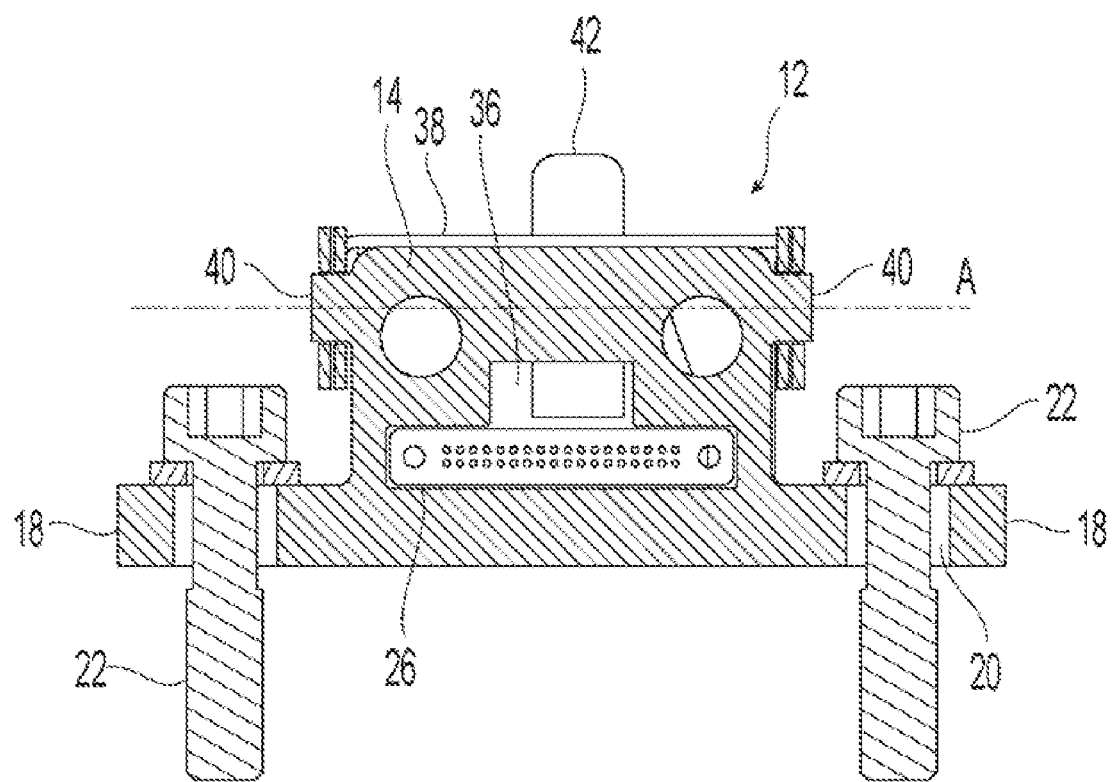
FIG. 4 is a cross section view of the adapter of FIG. 1.

Main portion 14 also has an opening 26 that extends through the main portion 14 between a first side 28 and a second side 30 and into which multi-fiber ferrules 32 are inserted. The multi-fiber ferrules have optical fibers 34 that are secured therein as is known in the art. The opening 26 optically and mechanically aligns and connects the multi-fiber ferrules 32 with one another. Adjacent to opening 26, and preferably in communication therewith, is a recessed portion 36 that receives and frictionally engages a portion of each of ferrule engagement members 38, discussed in more detail below. As best seen in FIG. 3, the recessed portion 36 may also extend between first side 28 and second side 30, although there may be two separate recessed portions on each side of the adapter 10.

Extending from the outside surface 16 of the main portion 14 are two projections 40 to which ferrule engagement members 38 are rotatably connected. The engagement members 38 have a central prong 42 that is used to move the engagement members 38 from an open position (illustrated on the left side of FIG. 3) so that the multi-fiber ferrules 32 can be inserted into the opening 26 to a closed position (illustrated on the right side of FIG. 3) so that the engagement members 38 block the multi-fiber ferrules 32 and prevent them from exiting the adapter 10. The engagement members 38 have two elongated members 44 that in the closed position engage a rear face 46 of the multi-fiber ferrules 32, holding the multi-fiber ferrules 32 in the adapter 10. In the closed position, a curved portion 48 of the central prong 42 frictionally engages the recessed portion 36, holding the engagement members 38 in the closed position. Adjacent the recessed portion 36 is a protrusion 50 that provides a larger surface of engagement by the curved portion 48 of the central prong 42 and, thus, better retention of the engagement members 38. The engagement members 38 are also resilient enough to accommodate a pin plate (not shown) that may be used with each of the multi-fiber ferrules 32. A pin plate and similar engagement members are illustrated in a co-pending application Ser. No. 11/673,152, entitled "Ferrule Adapter And Ferrule Adapter Assembly" and having attorney reference number USCO-020, filed on the same date, the contents of which are expressly incorporated in their entirety by reference herein.

Both engagement members 38 preferably rotate about the same two projections 40. The two projections 40 lie on the axis of rotation A of the engagement members 38, which is orthogonal to the opening 26. It should be noted that each of the engagement members 38 may each have a set of projections so that they do not rotate about the same axis of rotation. However, in the case of two different axes of rotation, they should be parallel to one another.

Figure 5A:
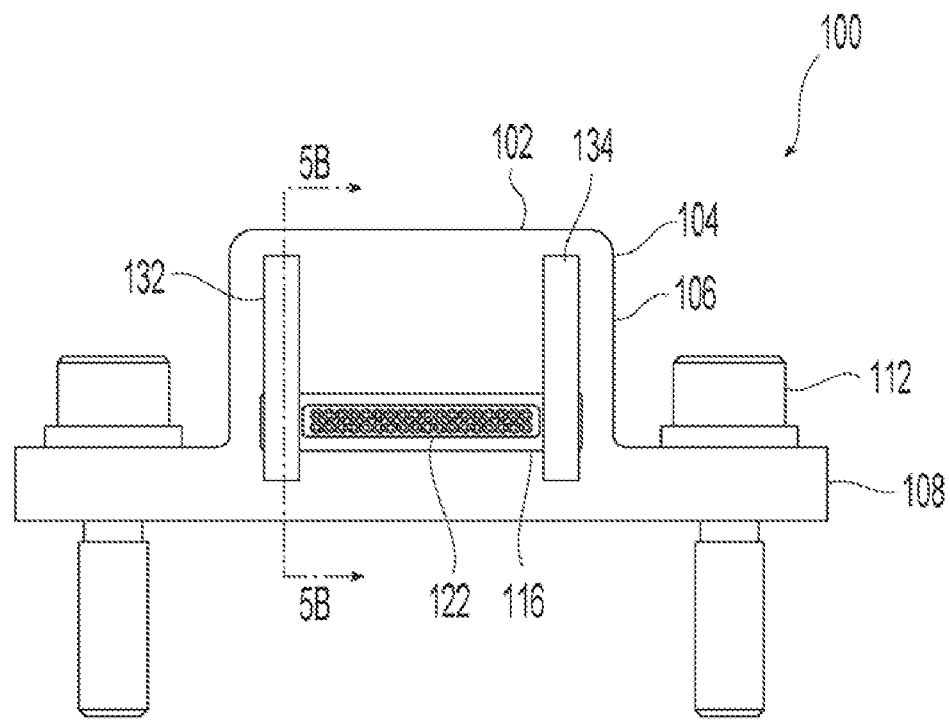
FIG. 5A is a front view of an alternative embodiment of an adapter according to the present invention with alternative engagement members.
Figure 5B:
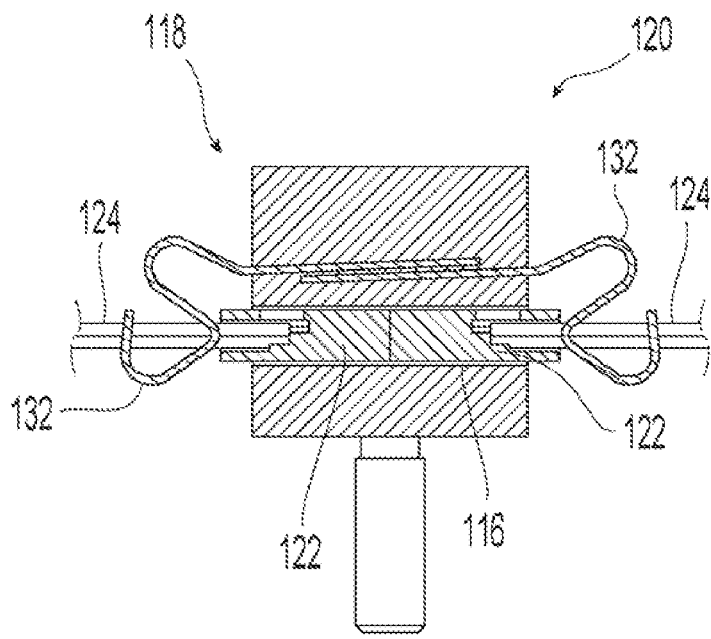
FIG. 5B is a cross section view of the adapter in FIG. 5A along the line 5B-5B.

An alternative embodiment of an adapter according to the present invention is illustrated in FIGS. 5A and 5B. The adapter 100 has a main body 102 with a main portion 104, an outside surface 106, and flanges 108 extending outward from the main portion 104. Each of the flanges 108 preferably has a mounting hole used to mount the adapter 100 to a PCB board, box, or other structure. It is also possible for projections or legs to extend downward, rather than holes and screws, to secure the adapter 100 to the appropriate structures. The flanges 108 are preferably integral with the main portion 104, but may be separate from but connected to the main portion 104. Screws 112 are used to mount the adapter 100 to the appropriate structure. Main portion 104 also has an opening 116 that extends through the main portion 104 between a first side 118 and a second side 120 and into which multi-fiber ferrules 122 are inserted. The multi-fiber ferrules have optical fibers 124 that are secured therein as is known in the art. The opening 116 optically and mechanically aligns and connects the multi-fiber ferrules 122 with one another.

Extending from the main body 102 on both sides thereof is an engagement member that is preferably a fixed spring latch that includes two elastic members 132,134 that extend out of the main body 102 adjacent the opening 116. The two elastic members 132,134 forcibly push inward on the rear face of the multi-fiber ferrule 122 (preferably with a force of about 2 lbs.) to keep multi-fiber ferrule 122 in the adapter 100. The two elastic members 132,134 can be pushed upward away from the opening 116 to allow the multi-fiber ferrule 122 to be inserted into the opening 116 and then released to hold the multi-fiber ferrule 122 therein. The elastic members 132,134 can also accommodate a pin plate as necessary.

Figure 6A:
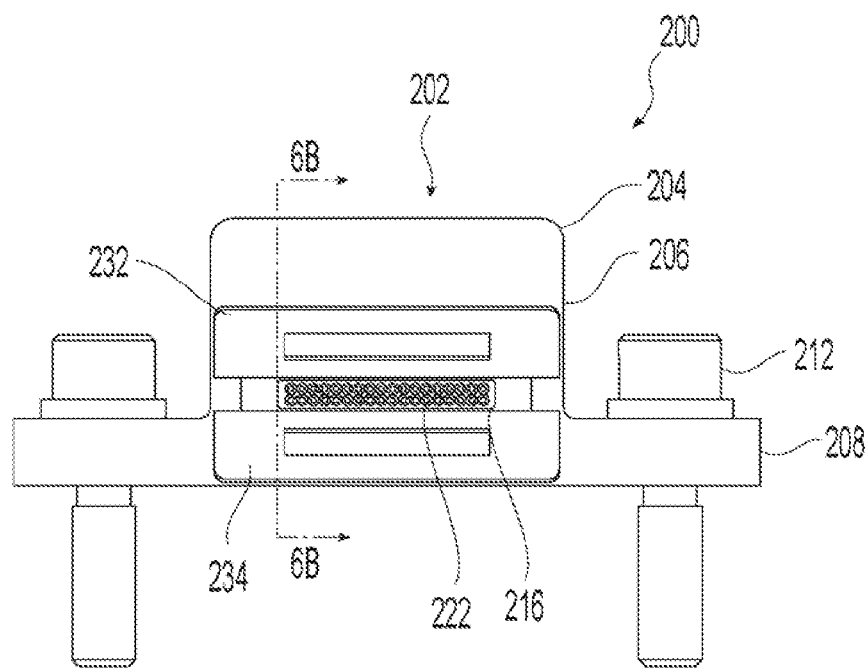
FIG. 6A is a front view of an alternative embodiment of an adapter according to the present invention with alternative engagement members.
Figure 6B:
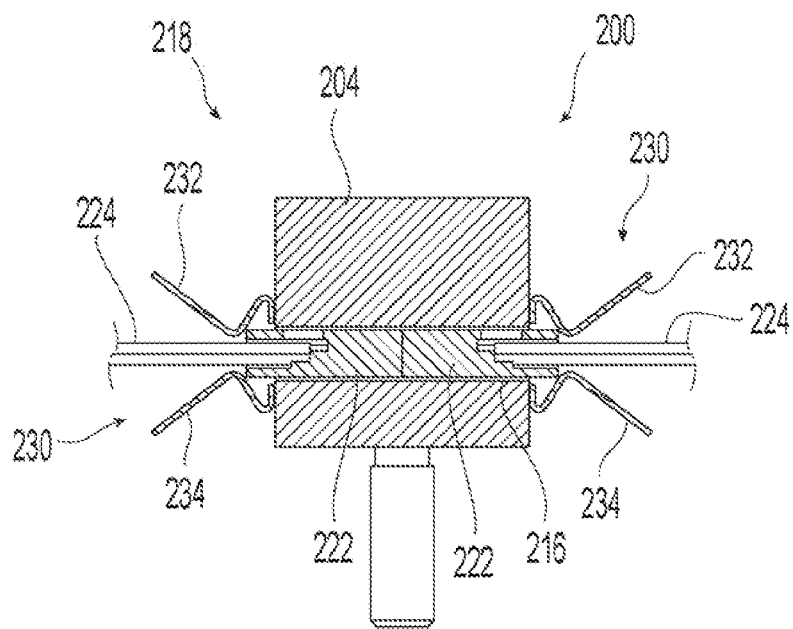
FIG. 6B is a cross section view of the adapter in FIG. 6A along the line 6B-6B.

An alternative embodiment of an adapter according to the present invention is illustrated in FIGS. 6A and 6B. The adapter 200 as a main body 202 with a main portion 204, an outside surface 206, and flanges 208 extending outward from the main portion 204. Each of the flanges 208 preferably has a mounting hole to mount the adapter 200 to a PCB board, box, or other structure. It is also possible for projections or legs to extend downward, rather than holes and screws, to secure the adapter 200 to the appropriate structures. The flanges 208 are preferably integral with the main portion 204, but may be separate from but connected to the main portion 204. Screws 212 are used to mount the adapter 200 to the appropriate structure. Main portion 204 also has an opening 216 that extends through the main portion 204 between a first side 218 and a second side 220 and into which multi-fiber ferrules 222 are inserted. The multi-fiber ferrules have optical fibers 224 that are secured therein as is known in the art. The opening 216 optically and mechanically aligns and connects the multi-fiber ferrules 222 with one another.

Engagement member 230 is preferably a one piece (although it could be any number of pieces) fixed spring latch that is disposed on at least two sides of opening 216 and is at least partially embedded into the main portion 204. Engagement member 230 has a first spring portion 232 on a first side of opening 216 that extends upward from the main portion 204 and towards opening 216 and then continues to extend upward but away from opening 216. Engagement member 230 has a second spring portion 234 on an opposite side of opening 216 that extends upward from the main portion 204 and towards opening 216 and first spring portion 232 and then continues to extend upward but away from opening 216. As illustrated best in FIG. 6B, the spring two portions 232 and 234 of the engagement member 230 provide a funnel-like opening therein to receive the multi-fiber ferrule 222 and, because of the elastic characteristics of the spring portions 232,234 of engagement member 230, will move away from one another to allow the multi-fiber ferrule 222 to be inserted into opening 216. Once the multi-fiber ferrule 222 is inserted completely into opening 216, the two spring portions 232, 234 of the engagement member 230 will return to engage a rear portion of the multi-fiber ferrule 222 to keep multi-fiber ferrule 222 in the adapter 200. The engagement member 230 can also accommodate a pin plate as necessary.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A ferrule-to-ferrule adapter comprising:
   a main body having an outside surface;
   an opening extending through the main body between a first side of the main body and a second side of the main body, the opening configured to receive and to optically and mechanically mate two monolithic multi-fiber ferrules to one another, each monolithic multi-fiber ferrule directly attached to at least one optical fiber, the monolithic multi-fiber ferrules having a front face and a rearmost face opposite thereto, the front face being inserted into the opening perpendicularly oriented to an insertion direction of the monolithic multi-fiber ferrules; and two ferrule engagement members connected to the main body and disposed adjacent the opening on each side of the main body, each ferrule engagement member movable to a first position to engage only the rearmost face of a respective one of the monolithic multi-fiber ferrules after being inserted into the opening, the engagement members retaining the monolithic multi-fiber ferrules in the ferrule-to-ferrule adapter in mechanical and optical engagement.

2. The ferrule-to-ferrule adapter according to claim 1, wherein a longitudinal axis extends along the opening in the main body between the first and second sides, and wherein each of the two engagement members are rotatably connected to the main body and rotate about an axis orthogonal to the longitudinal axis in the opening to engage the multi-fiber ferrules.

3. The ferrule-to-ferrule adapter according to claim 2, wherein the two engagement members rotate about the same axis.

4. The ferrule-to-ferrule adapter according to claim 1, wherein each engagement member is a fixed spring latch.

5. The ferrule-to-ferrule adapter according to claim 4, wherein each fixed spring latch is at least partially embedded in the main body.

6. The ferrule-to-ferrule adapter according to claim 4, wherein each fixed spring latch is disposed on two sides of the opening on the first side and the second side of the main body.

7. The ferrule-to-ferrule adapter according to claim 1, further comprising at least one flange, the flange extending outwardly from the main body and having at least one mounting hole disposed therein.

8. The ferrule-to-ferrule adapter according to claim 1, wherein the engagement members frictionally engage the main body adjacent the opening on respective sides of the main body thereby preventing unintended movement of the engagement members.

9. The ferrule-to-ferrule adapter according to claim 1, wherein the main body has a recess on each side thereof adjacent the opening, each recess configured to receive a portion of each engagement member to retain the respective engagement member in a closed position.

10. A ferrule-to-ferrule adapter and fiber optic assembly, comprising:

two multi-fiber ferrules, each multi-fiber ferrule having at least one optical fiber that terminates at a front face of the multi-fiber ferrule;

an adapter main body having an outside surface;

an opening extending through the main body between a first side of the main body and a second side of the main body, the opening configured to receive and to optically and mechanically mate the two multi-fiber ferrules to one another at the front faces thereof; and two ferrule engagement members directly connected to the main body and disposed adjacent the opening on each side of the main body, wherein the ferrule engagement members are configured to engage a rearmost face of a respective one of the multi-fiber ferrules only after the multi-fiber ferrules have been inserted into the opening.

11. The ferrule-to-ferrule adapter and fiber optic assembly according to claim 10, further comprising at least one mounting hole extending through the main body, the at least one mounting hole being orthogonal to the opening.

12. The ferrule-to-ferrule adapter and fiber optic assembly according to claim 10, wherein a longitudinal axis extends along the opening in the main body between the first and second sides, and wherein the two engagement members are rotatably connected to the main body and rotate about an axis orthogonal to the longitudinal axis in the opening to engage a rearward face of each multi-fiber ferrule.

13. The ferrule-to-ferrule adapter and fiber optic assembly according to claim 10, wherein the two engagement members rotate about the same axis.

14. The ferrule-to-ferrule adapter and fiber optic assembly according to claim 10, wherein each engagement member is a fixed spring latch.

15. The ferrule-to-ferrule adapter and fiber optic assembly according to claim 10, wherein each fixed spring latch is at least partially embedded in the main body.

16. The ferrule-to-ferrule adapter and fiber optic assembly according to claim 10, wherein each fixed spring latch is disposed on two sides of the opening on the first side and the second side of the main body.

17. The ferrule-to-ferrule adapter and fiber optic assembly according to claim 10, wherein the engagement members frictionally engage the main body adjacent the opening on respective sides of the main body thereby preventing unintended movement of the engagement members.

18. The ferrule-to-ferrule adapter and fiber optic assembly according to claim 10, wherein the main body has a recess on each side thereof adjacent the opening, each recess configured to receive a portion of each engagement member to retain the respective engagement member in a closed position.

* * * * *